INVENTOR
G. R. CASS

ATTORNEYS

INVENTOR
G. R. CASS

ATTORNEYS

United States Patent Office 3,276,525
Patented Oct. 4, 1966

3,276,525
METHOD AND APPARATUS FOR DYNAMICALLY WEIGHING OBJECTS IN MOTION
George R. Cass, Montreal, Quebec, Canada, assignor to Canadian National Railway Company, Montreal, Quebec, Canada
Filed June 15, 1964, Ser. No. 374,985
15 Claims. (Cl. 177—1)

This invention relates to a method and apparatus for weighing moving bouncing objects, and more particularly to a method and apparatus for weighing railroad cars as they move across a weigh-bridge at speeds of up to 15 m.p.h., with an accuracy of within ±0.15% of the true static weight of the railroad car.

In the following specification the weighing of moving railroad cars will be emphasized, but it will be understood that the basic principles of dynamic weighing as set forth in this specification can be applied to any form of dynamic weighing, such as the weighing of livestock carcasses as they move along a conveyor, or in mining, or like operations, the weighing of ore carrier buckets as they move along a conveyor.

For any moving object the most likely modes of vibration are the natural modes of the system. In a railroad car, fully scale borne on a weigh-bridge, the pitch (angular oscillations about the short or width axis) and roll (angular oscillations about the longitudinal axis) vibrations are fully compensated, since a weight decrease on one side or end of a car appears as a corresponding weight increase on the other side or end of the car.

The only uncompensated vibration is bounce, or vertical oscillations, which may arise from numerous sources, including the following:

(a) Bouncing of the vehicle on its suspension as it passes over the weigh-bridge.

(b) Vibration of the weigh-bridge beams in their natural modes due to excitation caused by the moving vehicle (e.g., flats on wheels, impulse caused by the vehicle crossing gaps in the rails as it runs on to the weigh-bridge, etc.).

(c) Vibrations picked up from external sources and effecting the weigh-bridge supports through the ground.

A further source of vibration arises from the fact that the railroad car, in its approach to the weigh-bridge, passes over a hump and runs freely on the tracks down an incline of usually 6% gradient before passing over the weigh-bridge, which has an incline of usually 1¾% gradient. Thus the relatively sudden change of gradient will aggravate the bounce condition outlined in (a) above.

It has been ascertained that the lowest frequency, and thus the worst condition, of bounce arising in moving railroad cars is approximately 3 cycles per second in a fully loaded car, and this frequency can be expected to appear in the output of any weighing system.

This means that, in the worst instance, weight readings taken over a period of time will vary from maximum to minimum values of the true weight three times in every second. Again taking the worst instance, these maximum and minimum values can amount to instantaneous weight readings of up to ±20% of the true weight of the vehicle.

The vibrations imposed by the conditions outlined in (b) and (c) will add further maximum and minimum values, though of a higher frequency, which will be superimposed on the bounce frequency.

Thus for any weighing system to weigh a moving vehicle with an acceptable accuracy, it must interpret the true weight of the vehicle from a series of varying instantaneous weight readings, as any single instantaneous weight reading may be as much as 20% over or under the true weight of the vehicle.

Most weighing systems in use at the present time are unable to interpret true weight from a series of varying instantaneous weight values. Thus the vehicle must be stopped and the true weight determined statically.

This imposes many disadvantages, foremost of which are the uneconomic factors involved in stopping the moving object and then weighing it statically, thus severely limiting the number of objects which can be weighed in a given period of time.

One widely used weighing system embodies a null-balancing servo-mechanism to measure the output from load cells. This system can be used to determine the weight of a moving object, but the output reading still contains inaccuracies of up to ±2.5% of the true weight of the object, due to the inertia of the servo-mechanism, which tends to follow the instantaneous weight variations.

The present invention provides a method and apparatus for dynamically weighing a moving object without changing the speed at which the object is moving and with an accuracy of within ±0.15% of the true weight of the object.

In the basic form of this invention, weigh-bridge beams are supported on a number of strain gauge load cells which, for a given voltage input, produce a voltage output proportional to the instantaneous load upon the bridge. This output voltage is then amplified and fed, for a predetermined period of time, into a double pole filter network which effectively performs an imperfect mathematical integration on the output signal and produce an output substantially equal to the true static weight of the object plus an oscillatory term whose amplitude is reduced to $\frac{1}{13}$ of its original value. This improved output signal from the double pole filter network is then fed, for a predetermined period of time, into an electronic integrator which performs a perfect mathematical integration on the signal and produces an output equal to the true static weight of the object plus an oscillatory term which has been reduced to a maximum amplitude of ±0.15% of the true static weight of the object. This basic form includes the factors of integration time and D.C. excitation voltage, both of which may be subject to slight variations and must be extremely accurately stabilized in order to consistently produce weight readings of the required accuracy.

In alternative executions of this invention a further integration stage is connected in parallel with the apparatus outlined above and performs a perfect integration on the D.C. excitation voltage for the same predetermined period of time as for the perfect integration performed on the signal received from the double pole filter network. Thus identical factors of integration time and D.C. excitation voltage appear in the outputs from both integration stages and when these outputs are divided, one into the other, these factors will cancel out and leave the resultant, which is the weight reading, independent of either time or D.C. excitation voltage.

It is, therefore, the main object of the present invention to provide a method and apparatus for dynamically weighing moving bouncing railroad cars to an accuracy equal to or better than ±0.15% of the static weight of the railroad car.

Another object of the present invention is to provide a method and apparatus for dynamically weighing moving bouncing railroad cars to the above accuracy without the need for changing the speed at which the car is moving.

A further object of the present invention is to provide a method and apparatus for dynamically weighing moving bouncing railroad cars which eliminates possible variables, such as the voltage of the power supply and timer inaccuracies, from the factors producing the weight readings, and thus produces consistently accurate weight readings without the need for accurate stabilization of these possible variable factors.

These and other objects and advantages of this invention will be further apparent by reference to the following detailed specification and figures, in which.

Figure 1:
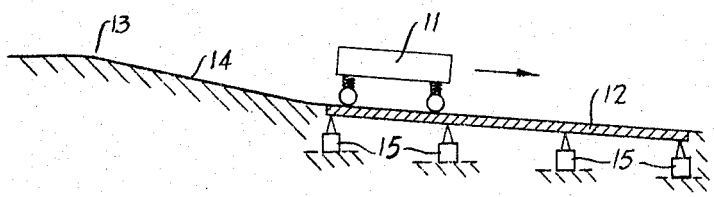
FIG. 1 is a schematic representation of a railroad car moving over a weigh-bridge supported on load cells.

With particular reference now to the figures, in which similar reference numerals represent similar parts throughout, FIG. 1 shows a schematic representation of a railroad car 11 moving across a weigh-bridge 12 having an incline of 1¾% gradient, the car having passed over hump 13 and run down an approach 14 having an incline of 6% gradient. Weigh-bridge 12 is freely supported on eight strain-gauge load cells 15 (four per side).

Figure 2:
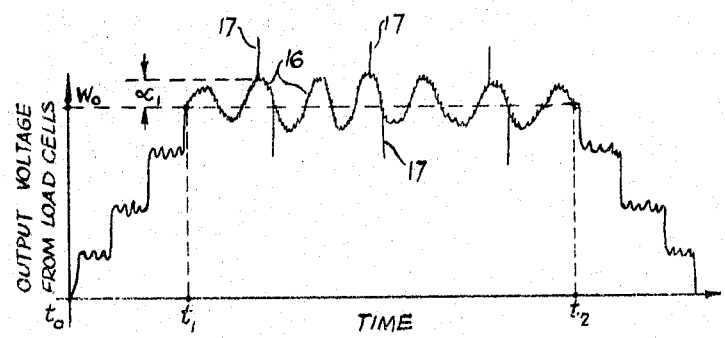
FIG. 2 is a graphical representation of the voltage outputs from the load cells in FIG. 1, which are proportional to the instantaneous loads on the weigh-bridge.

FIG. 2 shows a graphical representation of the voltage outputs from load cells 15 which are proportional to the instantaneous loads on weigh-bridge 12.

Load cells 15 are basically transducers which produce an electrical output proportional to the load imposed upon them. In the following description of this invention load cells 15 are of the passive type, which require a steady D.C. excitation input voltage to produce the required output voltage for a given load.

In FIG. 2 it can be seen that when railroad car 11 is approaching weigh-bridge 12 there is initially no load on the bridge, as shown by $t_0$, and thus no output voltage. As railroad car 11 enters weigh-bridge 12 the successively entering wheels will produce a voltage output of increasing level, until car 11 is fully on the bridge, or fully scale borne, as shown at $t_1$. The voltage output signal from $t_1$ to $t_2$ represents the time in which car 11 remains fully scale borne, after which the voltage output decreases, as the wheels successively leave weigh-bridge 12. Thus the output voltage represented by $t_1$ to $t_2$ is the signal which must be considered in order to ascertain the true static weight $W_0$ of car 12.

Examination of the signal between $t_1$ and $t_2$ shows that the alternating bounce component 16, superimposed on $W_0$, has a maximum amplitude of $\alpha_1$. Also, further examination of the signal between $t_1$ and $t_2$ clearly shows the higher frequencies superimposed on the bounce frequency, due to bridge structure vibrations, etc., and the sharp impulses 17, caused by flat wheels.

In accordance with the present invention, the theoretical determination of true weight is as follows:

Consider the weight signal from $t_1$ to $t_2$. Assuming that the instantaneous weight at any time $t$ is $W_t$ and the true static weight of the car is $W_0$, then the graph of $t_1$ to $t_2$ becomes:

$$W_t = W_0[1 + \alpha_1 \sin(w_1 t + \theta_1) + \alpha_1 \sin(w_2 t + \theta_2) \ldots + \alpha_n \sin(w_n t + \theta_n)] \quad \text{(Eq. 1)}$$

where $w_1$ is the natural bounce frequency of the car = at least 20 radians per second $w_2$ is the natural vibration of the bridge = about 180 radians per second $w_n$ are the other higher frequencies $\alpha_1$ is the bounce amplitude as a fraction of the static weight (approximately 0.2 or 20% of the true static weight)

$\alpha_2, \alpha_n$ . . . etc., are the amplitudes of the other higher frequencies $\theta_1, \theta_2, \theta_n$ . . . etc., are the instantaneous phase angles of the various oscillatory components at time $t$.

It is seen that successive integrations of Eq. 1 reduces the oscillatory components by $1/w$ for each integration, thus one integration yields:

$$\int W_t dt = W_0\left[t - \frac{\alpha_1}{w_1}\cos(w_1 t + \theta_1) - \frac{\alpha_2}{w_2}\cos(w_2 t + \theta_2) - \ldots\right] + K_1 \quad \text{(Eq. 2)}$$

Since $\alpha_2$ is very small (about 0.01) and $w_2$ is approximately 180, all terms beyond $w_1$ are neglected. Thus:

$$\int W_t dt \cong W_0\left[t - \frac{\alpha_1}{w_1}\cos(w_1 t + \theta_1) + \frac{\alpha_1}{w_1}\cos\theta_1\right] \quad \text{(Eq. 3)}$$

since $\int W_t dt \equiv 0$ at the beginning of integration.

A second integration of Eq. 3 yields:

$$\int\int W_t dt = W_0\left[\frac{t^2}{2} - \frac{\alpha_1}{w_1}\sin(w_1 t + \theta_1) + \frac{\alpha_1}{w_1}(\cos\theta_1)t + \frac{\alpha_1}{w_1^2}\sin\theta_1\right] \quad \text{(Eq. 4)}$$

again $\int\int W_t dt \equiv 0$ at the beginning of integration.

It is seen that if $t$ is defined (at say 1 second) then the oscillatory term has been reduced to $\frac{1}{400}$ of its initial amplitude. Thus the $$\frac{\alpha_1}{w_1^2}$$

terms will be neglected.

However, the $$\frac{\alpha_1}{w_1}$$

term cannot be disregarded. This term arose out of the initial conditions from the first integration. Thus, the first integration process must be modified slightly to deal with this initial condition. This can be done in two ways:

(a) Compute $K_1$ at time $t$ and subtract.

(b) Cause $K_1$ to be "forgotten."

Solution (a) involves a lengthy mathematical process.

Figure 3:
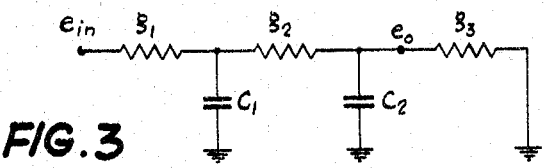
FIG. 3 is an electrical circuit diagram of the double pole filter network used in this invention.

Solution (b) was, therefore, chosen and embodied as follows:

The alternating load signal 16 in FIG. 2 is applied to the double pole filter network shown in FIG. 3. $e_{in}$ is the applied signal and $e_o$ is the output.

This network effectively carries out an imperfect integration on the input signal $e_{in}$ and produces an output $e_o$ equal to the static weight $W_0$ plus an oscillatory term whose amplitude is reduced to $\frac{1}{13}$ of its initial value.

This is shown mathematically as follows:

Using the differential operator symbol $D$ $$e_o = e_{in} \times \frac{1}{D^2\frac{C_1 C_2}{g_1 g_2} + D\left\{\frac{C_2}{g_2}\left(\frac{g_1+g_2}{g_1}\right) + \frac{C_2}{g_1}\left(\frac{g_3+g_2}{g_2}\right)\right\} + \frac{g_3}{g_2} + \frac{g_3}{g_1} + 1} \quad \text{(Eq. 5)}$$

But $$\frac{C_1}{g_1} = \frac{C_2}{g_2} = \frac{1}{w_0} = \frac{1}{5} \quad \text{(Eq. 6)}$$

The values of the components shown in FIG. 3 are as follows:

Capacitors: $C_1=20$ mfd.; $C_2=0.6$ mfd.

Conductances: $g_1=100$ micromho; $g_2=3$ micromho; $g_3=1$ micromho.

$g_1$, $g_2$ and $g_3$ are resistors of value 10,000 ohms, 333,000 ohms, and 1,000,000 ohms, respectively.

Substitution of these values in Eq. 5 and the solution thereof shows that if the weight signal is suddenly applied at time $t_1$, $e_0$ will build up to within $1.7 \times 10^{-4}$ part of the unit term $W_0$ within two seconds. This is the characteristic solution of differential Equation No. 5.

At the same time the sinusoidal term $\alpha_1$ will be reduced by a factor of 1/17.4. The unit or D.C. term will be reduced 1/1.34, so that the ratio reduction will be 1/13.

Thus the output of this network will be a unit term plus an oscillatory term whose amplitude is reduced to 1/13 of its former value. Thus after two seconds:

$$e_o = W_0 \left[ 1 + \frac{\alpha_1}{13} \sin(w_1 t + \phi) \right] \quad \text{(Eq. 7)}$$

the factor 1/1.34 which is fixed, will be neglected.

Integration of Eq. 7 now results in an output equal to the true static weight $W_0$ plus an oscillatory term whose amplitude is further reduced to a maximum of 0.15% of $W_0$.

Thus one integration yields:

$$\int e_o dt = W_0 \left[ t - \frac{\alpha_1}{13 \times w_1} \cos(w_1 t + \phi) + \frac{\alpha_1}{13 \times w_1} \cos \phi \right] \quad \text{(Eq. 8)}$$

Since $w_1 \geq 20$ and $\cos \phi = \pm 1$ at the most $$\int e_o dt = W_0 \left[ t - \frac{\alpha_1}{260}(\pm 1) + \frac{\alpha_1}{260}(\pm 1) \right] \quad \text{(Eq. 9)}$$

Thus, from Eq. 9 it is seen that the longer the integration is allowed to run, the more accurate the answer will become. For $t=$ one second:

$$\int e_o dt = W_0 \left[ 1 \pm \frac{\alpha_1}{130} \right] \quad \text{(Eq. 10)}$$

For $\alpha_1 = 0.2$ $$\int e_o dt = W_0 \left[ 1 \pm \frac{0.2}{130} \right]$$
$$= W_0 [1 \pm 0.0015] \quad \text{(Eq. 11)}$$

Eq. 11 shows that the maximum amplitude of the oscillatory term will be equal to 0.15% of $W_0$, which, therefore, achieves the main objective of this invention.

Eq. 11 assumes a bounce frequency of 20 radians per second. In actual practice a fully loaded railroad freight car will have a bounce frequency of no less than 21 to 22 radians per second. Thus Eq. 1 is very pessimistic and in practice the amplitude of the oscillatory term will always be considerably less than the maximum of 0.15% $W_0$ in Eq. 11.

Figure 4:
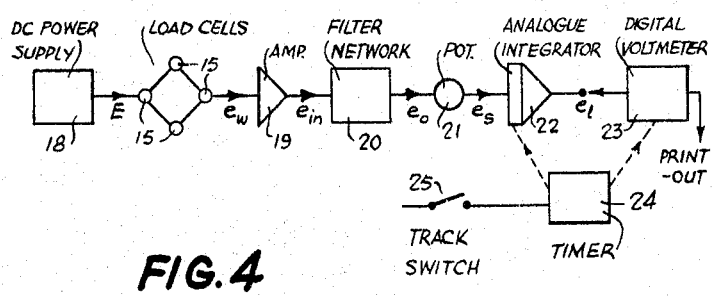
FIG. 4 is a schematic block representation of the basic form of this invention, using an analogue intergrator.

Reference now to FIG. 4 shows a schematic block representation of the basic apparatus for carrying out the theoretical calculations.

A D.C. power supply 18 supplies 13.714 volts, shown as E, for excitation of load cells 15. Each load cell 15 produces 0.00175 volt output, for every volt of D.C. excitation voltage, at a load of 200,000 lbs. Thus the total voltage from the eight cells 15 (in four pairs) is $$e_w = 1.75 \times 10^{-3} \times \frac{13.714}{8} = 0.003$$

volt for 200,000 lbs. load on bridge 12, where the D.C. excitation is 13.714 volts.

$e_w$ is fed to an amplifier 19, which has a gain of 500, and thus provides an input $e_{in}=1.5$ volts to the double pole filter network 20, shown in detail in FIG. 3. Network 20 has an attenuation of 0.745 and so the output signal $e_0=1.5 \times 0.745$ volt is fed to a potentiometer 21, having an attenuation of 0.9, to provide an output $e_s=1.00$ volt.

Output $e_s$ is then fed into an analogue integrator 22 which is adjusted to have a gain of 2 and thus provides an output $e_1=2$ volts per second for the 1 volt input. The output $e_1$ is then fed to a digital voltmeter 23, scaled to read 200,000 for a 2 volt input.

Timer 24 is connected to actuate both analogue integrator 22 and digital voltmeter 23 as required and is initiated by the closing of track switch 25, which is positioned on the tracks on weight-bridge 12 and closes when car 11 has been fully scale borne for 2 seconds.

The output from digital voltmeter 23 is read directly as a weight reading, or is fed to a suitable print-out stage.

The length of weight-bridge 12, and the speed at which car 11 moves thereover, are such that car 11 will remain fully scale borne for at least 3 seconds.

In operation therefore, as soon as car 11 enters weighbridge 12 the voltage output from load cells 15 is fed into network 20. When the car is fully scale borne this voltage will be equivalent to the static weight $W_0$ of car 11 plus an oscillatory component having an amplitude of up to $\pm 20\%$ of $W_0$. Network 20 performs an imperfect integration on the input signal $e_{in}$ and, after a period of 2 seconds, will have reduced the amplitude of the oscillatory component to 1/13 of its initial value.

After car 11 has been fully scale borne for 2 seconds, track switch 25 closes and starts time 24, which holds analogue integrator 22 in the "integrate" mode for 1 second, after which timer 24 places integrator 22 in the "hold" mode and simultaneously signals a "read" command to digital voltmeter 23.

Analoque integrator 22 performs a perfect integration of the input signal $e_s$ and, after a period of 1 second, produces an output equivalent to $W_0$ plus an oscillatory component now reduced to a maximum amplitude of $\pm 0.15\%$ of $W_0$. Thus digital voltmeter 23 will indicate a weight reading equal to the true static weight of car 11 with a maximum error of $\pm 0.15\%$ of said true weight, or signal the print-out stage accordingly.

Figure 5:
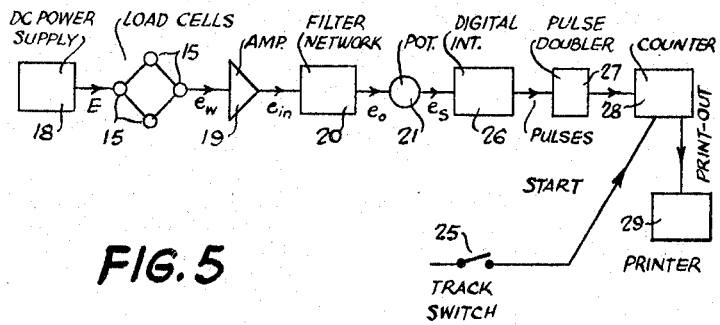
FIG. 5 is a schematic block representation, similar to FIG. 4, but using a digital integrator.

Reference to FIG. 5 shows an alternative execution of the basic apparatus, which is similar to the execution shown in FIG. 4, but wherein more convenient instrumentation is used.

D.C. power supply 18 again supplies 13.714 volts for excitation of load cells 15, which again provide a total output $E_w=0.003$ volt for 200,000 lbs. load on bridge 12. $e_w$ is again fed through amplifier 19, network 20 and potentiometer 21, to provide output $e_s=1$ volt, which is fed to a digital integrator 26. Digital integrator 26 produces an output of 10,000 pulses per second for 1 volt input. The output from digital integrator 26 is fed to a pulse doubler 27, which produces an output of 20,000 pulses per second per 200,000 lb. load on bridge 12.

In this execution the output pulses from pulse doubler 27 are fed to a digital counter 28. Digital counter 28 includes a very accurate crystal clock which precisely controls the time in which digital counter 28 is held in the "pulse count" mode.

Thus after car 11 has been scale borne for 2 seconds track switch 25 closes and actuates the crystal clock which holds the digital counter 28 in the pulse counting mode for exactly 1 second, giving a reading of 20,000 pulses. A fixed zero is added after the count to provide an output reading of 200,000 for a 200,000 lbs. load on bridge 12.

The output reading of 200,000 is fed into a tele-type printer 29, to provide a convenient record of weight reading.

The accuracy of this process depends upon the stability of the D.C. power supply and the gain products of the amplifier, resistance ratios, the gain factor of the digital integrator, and the precision of the 1 second timing of the counter. The basic instrumentation precision can be held to 0.01%.

In this alternative execution, the output presentation equals:

$$\text{Output} = E \times k_1 \times W \times k_2 \times k_3 \times k_4 \times k_5 \times 2 \times t \quad \text{(Eq. 12)}$$

Where:

$E$ = D.C. excitation voltage = 13.714 volts.
$k_1$ = Load cell factor
$$= \frac{1.75 \times 10^{-3}}{8}$$

volts per D.C. volt per 200,000 lbs.
$W$ = The weight in 200,000 lb. increments (or fractions thereof).
$k_2$ = Amplifier gain = 500.
$k_3$ = Network D.C. attenuation = 0.745.
$k_4$ = Potentiometer ratio = 0.9.
$k_5$ = Digital integrator scale factor = 10,000 pulses per second per 1 volt input.
$2$ = Pulse double gain.
$t$ = Time of count = 1 second.

The output presentation for the basic apparatus is similar.

Thus in both of the aforementioned executions the accuracy of the result depends upon the stability of the D.C. power supply and accurate timing. In the alternative execution this is adequately provided for by precise stabilization of the D.C. power supply and by use of the accurate crystal clock.

Figure 6:
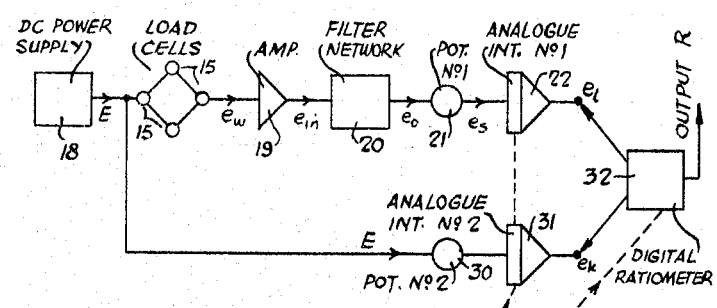
FIG. 6 is a schematic block representation of an alternative execution of this invention using analogue integrators in parallel.

Reference now to FIG. 6 shows a schematic block representation of another alternative execution in which a second analogue integrator is connected in parallel with the basic apparatus and preforms an integration on the D.C. excitation voltage E for the same period of time as for the integration performed by the first analogue integrator in the basic apparatus. Thus the outputs from both first and second integrators depend upon identical factors of D.C. excitation voltage and integration time. These outputs are fed to a digital ratiometer which divides the output from the second integrator into the output from the first integrator, resulting in the cancellation of both D.C. excitation voltage and integration time and making the result independent therefrom.

In this execution D.C. power supply 18 again supplies 13.714 volts for excitation of load cells 15, which provide a total output of $e_w = 0.003$ volt for 200,000 lbs. load on weigh-bridge 12.

$e_w$ is again fed through amplifier 19, network 20 and potentiometer 21, to provide an output $e_s = 1$ volt, which is fed to analogue integrator 22. Integrator 22 has a gain of 2 and provides an output $e_1 = 2$ volts for the 1 volt input.

D.C. power supply 18 also supplies 13.714 volts in parallel to potentiometer 30, which has an attenuation of $$\frac{1}{13.714}$$

and thus provides 1 volt input to analogue integrator 31. Integrator 31 has a gain of 1 and thus provides an output $e_k = 1$ volt.

Outputs $e_1$ and $e_k$ are fed to digital ratiometer 32 which divides $e_k$ into $e_1$ and provides an output equivalent to the true static weight $W_0$ of car 11 plus an oscillator component having a maximum amplitude of $\pm 0.15\% W_0$. Analogue integrators 22 and 31 are actuated simultaneously by timer 24.

In operation, therefore, when car 11 has been fully scale borne for 2 seconds track switch 25 closes and starts timer 24 which simultaneously places analogue integrators 22 and 31 in the "integrate" mode for approximately 1 second (T). After this time period timer 24 places integrators 22 and 31 in the "hold" mode and simultaneously signals a read command to digital ratiometer 32.

Digital ratiometer 32 divides the output $e_k$ from integrator 31 into $e_1$ from integrator 22 and is scaled to read 200,000 for 200,000 lbs. load on bridge 12. The output from analogue integrator 22:

$$e_1 = E \times k_1 \times W \times k_2 \times k_3 \times k_4 \times k_5 \times T \quad \text{(Eq. 13)}$$

Where:

$E$ = D.C. excitation voltage = 13.714 volts.
$W$ = Weight in 200,000 lb. increments (or fractions thereof).
$k_1$ = Load cell factor
$$= \frac{1.75 \times 10^{-3}}{8}$$

volts per D.C. volt per 200,000 lbs.
$k_2$ = Amplifier gain = 500.
$k_3$ = Network attenuation = 0.745.
$k_4$ = Potentiometer 21 ratio = 0.9.
$k_5$ = Integrator 22 gain = 2.
$T$ = Time of integration = approximately 1 second.

Also the output from analogue integrator 31:

$$e_k = E \times k_6 \times k_7 \times T \quad \text{(Eq. 14)}$$

Where:

$k_6$ = Potentiometer 30 attenuation
$$= \frac{1}{13.714}$$

$k_7$ = Integrator 31 gain = 1.

Digital ratiometer 32 thus finds the ratio of $e_1$ to $e_k$. And the output $$R = \frac{e_1}{e_k} = \frac{e.K_1.W.k_2.k_3.k_4.k_5.t}{e.k_6.k_7.t}$$

$$\therefore R = \frac{k_1.W.k_2.k_3.k_4.k_5}{k_6.k_7} \quad \text{(Eq. 15)}$$

It should be noted that E and T have been cancelled from Eq. 15, and thus this execution having integrators in parallel is independent of D.C. power supply variations and integration time (within limits). All terms in Eq. 15 are fixed and are highly stable. By proper choice of $k_4$ and $k_6$, Eq. 15 may be normalized to read 200,000 for 200,000 lbs. load on bridge 12. That is, in numerical terms:

$$R = \frac{\frac{1.75 \times 10^{-3}}{8} \times 1 \times 5 \times 10^2 \times 0.745 \times 0.9 \times 2}{\frac{1}{13.714} \times 1}$$

$\therefore R = 2.00000$ (as a ratio) and multiplied by a factor of $10^5$ then $R = 200,000$ lbs. (equivalent).

This execution provides extremely good long term stability since all the terms of Eq. 15 can be shown to be the ratios of fixed passive components (resisters and condensers).

Figure 7:
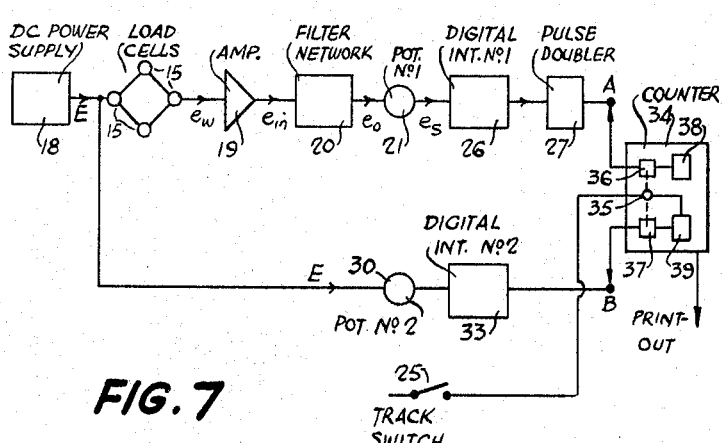
FIG. 7 is a schematic block representation of a further alternative execution of this invention using digital integrators in parallel.

Reference now to FIG. 7 shows a further alternative execution, which is similar to the execution shown in FIG. 6, but in which digital integrators are used in place of the analogue integrators and a digital counter replaces the digital ratiometer.

In this execution the output at point A is 20,000 pulses per second, as for the first alternative execution shown in FIG. 5. A second digital integrator 33, connected in parallel with digital integrator 26, has an input of 1 volt which is supplied from D.C. power supply 18 through potentiometer 30. The output at point B is thus 10,000 pulses per second, which is the direct output from integrator 33.

The outputs at points A and B are fed into a digital counter 34. When car 11 has been fully scale borne for 2 seconds, track switch 25 closes and signals start/stop control 35, in digital counter 34, which simultaneously opens gates 36 and 37 connected to points A and B, respectively, and starts the counting. When gate 36 is opened, register 38 will commence to count the pulses received from digital integrator 26, through pulse doubler 27. When gate 37 is opened, register 39 will commence to count pulses from integrator 33 and, when exactly 10,000 pulses have been counted, register 39 will signal start/stop control 35 which will then simultaneously close gates 36 and 37 and stop the counting. Thus digital integrator 33 supplies the timing pulses which control the integration time of digital integrator 26. After 10,000 pulses have been counted in register 39, register 38 will read 20,000, to which a fixed zero is added to read 200,000 for 200,00 lbs. load on bridge 12.

Any variation in the voltage of the D.C. power supply 18 will be reflected in the outputs from both integrators 26 and 33, and will not effect the accuracy of the result.

Again a print-out stage may be used if required, to conveniently indicate the reading in register 38.

In the executions described herein the instrumentation has been adapted to read multiples, or fractions, of 200,000 lb. weight units, but it will be understood that the instrumentation could equally well be adapted to use any units of weight, as required.

It should be noted that, in this specification, the term "inperfect integration" refers to the output from double pole filter network 20 which, after 2 seconds, reduces the amplitude of the oscillating component by $\frac{1}{13}$ of its initial value, and the term "perfect integration" refers to the outputs from the analogue and digital intergrators which, after 1 second, reduce the amplitude of the oscillatory component by a further $\frac{1}{20}$.

It should also be noted that, although all the executions described herein are based on the process of an imperfect integration followed by a perfect integration, in cases where the bounce component of the moving object is much less than ±20% a single, or a plurality, of imperfect integration stages could be used without a following perfect integration stage, or a perfect integration stage could be used alone. For example, where a railroad freight car is moving slowly over a weigh-bridge, the bounce component may be as low as 1% or 2% of the true weight, and in this case the weight signal passed through either the filter network, or an integrator, will reduce the oscillatory component to within acceptable limits of error. At the same time, increased integration time will allow the apparatus to reduce oscillatory components, having amplitudes greater than ±20%, to within acceptable limits of error.

From the foregoing it will be seen that the present invention provides a method and apparatus for achievin' all of the objects and advantages as set forth herein.

What I claim is:

1. A method of weighing a moving bouncing object comprising the steps of supporting said object on load cell mounted scale means during a portion of its movement, said load cells being energized by a power supply and producing an electrical output proportional to the instantaneous loads imposed thereon by said moving object, said output comprising a steady signal proportional to the static weight of said object plus oscillatory components superimposed thereon, then passing said output into a filter for a period of approximately 2 seconds which attenuates the amplitudes of the oscillatory components to $\frac{1}{13}$ of their original values and builds up to within $1.74 \times 10^{-4}$ of the static weight component of said object, then integrating the output from said filter in integrating means for a period of approximately 1 second which attenuates the amplitutes of said oscillatory components by a further $\frac{1}{20}$, then reading the output from said integrating means on a read-out means which indicates the weight of said object to an accuracy of within ±0.15% of the static weight, said weight indication being stabilized against variations in said power supply.

2. The method as set forth in claim 1, in which said weight indication is stabilized against variations in said power supply by integrating a sample of said power supply in a second integrating means simultaneously with the first mentioned integration step and for an identical period of time, said first and second integrating means being similar, then dividing the output from said second integrating means into the output from said first integrating means in said read-out means which indicates the weight of said object to within said accuracy.

3. Apparatus for weighing a moving bouncing object including scale means for supporting said moving object during a portion of its movement, said scale means mounted on load cell means, a power supply for energizing said load cell means such that said load cell means will produce an electrical output proportional to the instantaneous loads imposed thereon by said moving object, a double pole low pass filter network connected to said load cell means to receive the electrical output therefrom, said filter network having an A.C. response of at least $\frac{1}{13}$ at 3 cycles per second and a transient response reduced to within $1.7 \times 10^{-4}$ of the static weight component of said object within 2 seconds, integrator means connected to said filter network to receive and integrate the output therefrom, read-out means connected to said integrator means for indicating the output therefrom, timer means operatively connected to accurately control the integrating time of said integrator means and for initiating said read-out means, and means for stabilizing the output from said read-out means against variations in said power supply.

4. Apparatus as set forth in claim 3, in which said load cell means are energized by a D.C. excitation input voltage.

5. Apparatus as set forth in claim 3, including an amplifier electrically connected between said load cell means and said filter network.

6. Apparatus as set forth in claim 3, in which said integrator means comprises an analogue integrator.

7. Apparatus as set forth in claim 3, in which said integrator means comprises a digital integrator.

8. Apparatus as set forth in claim 3, in which said means for stabilizing the output from said read-out means includes a second integrator means connected to said power supply, said second integrator means being similar to said first mentioned integrator means, said second integrator means being connected to said read-out means, said read-out means adapted to indicate the ratio of the output from said first mentioned integrator means to the output from said second integrator means, said timer means controlling said second integrator means to integrate the signal from said power supply simultaneously with integrating operation of said first integrator means and for an identical period of time.

9. Apparatus as set forth in claim 8, in which said load cell means are energized by a D.C. excitation input voltage.

10. Apparatus as set forth in claim 8, in which said integrator means comprises an analogue integrator.

11. Apparatus as set forth in claim 8, in which said integrator means comprises a digital integrator.

12. Apparatus as set forth in claim 3, including an amplifier connected between said load cell means and said filter network and a potentiometer connected between said filter network and said integrator means, and in which said power supply is D.C., said integrator means is an analogue integrator and said read-out means is a digital voltmeter.

13. Apparatus as set forth in claim 3, including an amplifier connected between said load cell means and said filter network and a potentiometer connected between said filter network and said integrator means, and in which said power supply is D.C., said integrator means is a digital integrator and said read-out means is a pulse counter.

14. Apparatus as set forth in claim 8, including an amplifier connected between said load cell means and said filter network, and a first potentiometer connected between said filter network and said first mentioned integrator, and a second potentiometer connected between said power supply and said second integrator, and in which said power supply is D.C., said first and second integrator means are analogue integrators, and said readout means is a digital ratiometer.

15. Apparatus as set forth in claim 8, including an amplifier connected between said load cell means and said filter network, and a first potentiometer connected between said filter network and said first mentioned integrator, and a second potentiometer connected between said power supply and said second integrator, and in which said power supply is D.C., said first and second integrator means are digital integrators, and said readout means is a dual pulse counter.

References Cited by the Examiner

UNITED STATES PATENTS

| | | | |
|---|---|---|---|
| 2,627,372 | 2/1953 | Razek. | |
| 2,746,739 | 5/1956 | Philippovic | 177—16 |
| 2,998,090 | 8/1961 | Watson | 73—88.5 X |
| 3,022,469 | 2/1962 | Bahrs et al. | 332—14 |
| 3,063,635 | 11/1962 | Gordon. | |
| 3,108,648 | 10/1963 | Williams | 177—210 X |
| 3,173,503 | 3/1965 | Karlen | 177—211 X |
| 3,192,535 | 6/1965 | Watson | 177—1 |

FOREIGN PATENTS

| | | |
|---|---|---|
| 180,451 | 8/1962 | Sweden. |

RICHARD B. WILKINSON, *Primary Examiner.*

LOUIS J. CAPOZI, *Examiner.*

ROBERT S. WARD, *Assistant Examiner.*